350-96.1 SR
8/17/82 XR 4,344,691

United States Patent [19]

Grant et al.

[11] 4,344,691

[45] Aug. 17, 1982

[54] ZONAL CONCENTRATOR FOR ACCURATE ERASURE OF PHOTOCONDUCTOR CHARGE

[75] Inventors: Duane E. Grant, Boulder; James R. Walker, Longmont, both of Colo.

[73] Assignee: International Business Machines Corporation, Armonk, N.Y.

[21] Appl. No.: 162,216

[22] Filed: Jun. 23, 1980

[51] Int. Cl.$^3$ ........................ G03B 27/00; G03B 27/54

[52] U.S. Cl. ........................ 355/1; 350/96.1; 355/3 R; 355/67

[58] Field of Search ........................ 355/1, 3 R, 67; 350/96.1, 96.15

[56] References Cited

U.S. PATENT DOCUMENTS

| | | | |
|---|---|---|---|
| 3,580,675 | 5/1971 | Hieber et al. | 355/50 |
| 3,613,532 | 10/1971 | Wildhaber | 355/1 X |
| 4,008,954 | 2/1977 | Ogawa et al. | 355/3 R X |
| 4,082,451 | 4/1978 | Patel | 355/3 R X |
| 4,133,609 | 1/1979 | Arai | 355/3 R |
| 4,168,900 | 9/1979 | Adachi | 355/1 |
| 4,177,487 | 12/1979 | Takenouchi et al. | 358/294 |
| 4,190,347 | 2/1980 | Siegmund | 355/1 |
| 4,255,042 | 3/1981 | Armitage et al. | 355/3 R |

FOREIGN PATENT DOCUMENTS

| | | |
|---|---|---|
| 1275538 | 5/1972 | United Kingdom . |
| 2011647 | 7/1979 | United Kingdom . |
| 2042746 | 9/1980 | United Kingdom . |

*Primary Examiner*—Fred L. Braun
*Attorney, Agent, or Firm*—Charles E. Rohrer

[57] ABSTRACT

Erase apparatus for use in an electrophotographic copier machine where an array of light-emitting diodes (LEDs) is placed adjacent a plano-convex-cylindrical entrance end of an optical element such that light rays from the LED array are directed through the optical element to its exit end. At the convex-cylindrical exit end, the light rays are directed to the photoconductive surface of the machine. The optical element directs the more intense light rays emitted from the LEDs near the central axis to the edges of the erasure footprint while the less intense rays emitted from the LEDs at larger angles from the central axis are redistributed to the central portion of the erasure footprint.

14 Claims, 11 Drawing Figures

ZONAL CONCENTRATOR FOR ACCURATE ERASURE OF PHOTOCONDUCTOR CHARGE

This invention relates to document copier machines of the electrophotographic type and more particularly to the erasure of charge between images and on the edges of images produced on the photoconductive surfaces of these machines.

BACKGROUND OF THE INVENTION

In the electrophotographic process used in document copier machines of the transfer type, photoconductive material is supported by a rotating drum or arranged as a belt to be driven by a system of rollers so that it may be moved under a charge-generating station to place a relatively uniform electrostatic charge, usually several hundred volts, across the entirety of the surface. Next the photoconductor is moved to an imaging station where it receives light rays reflected from the document to be copied. Since white areas of the original document reflect large amounts of light, the photoconductive material is discharged to relatively low voltage levels in white areas while the dark areas continue to contain high voltage levels even after exposure. In that manner, the photoconductive material is caused to bear a charge pattern which corresponds to the printing, shading, etc. present on the original document.

After receiving the image, the photoconductor rotates to a developing station where a developing material, called toner, is placed on the image. This material may be in the form of a black powder which carries a charge opposite in polarity to the charge pattern on the photoconductor. Because of the attraction of the oppositely-charged toner, it adheres to the surface of the photoconductor in proportions related to the shading of the original. Thus, black printing should receive heavy toner deposits, white background areas should receive none, and gray or otherwise shaded portions of the original should receive intermediate amounts. The developed image is then moved to a transfer station where a copy-receiving material, usually paper, is juxtaposed to the developed image on the photoconductor and where a charge is placed on the back side of the copy paper so that when the paper is stripped from the photoconductor, the toner material is attached to the paper and removed from the photoconductor. The remaining process steps call for permanently bonding the toner material to the copy paper and cleaning any residual toner left on the photoconductive material so that it can be reused for a subsequent copy production.

In the cleaning step, it is customary to pass the photoconductor under a preclean charge-generating station to neutralize the charged areas and under an erase lamp to discharge any remaining charge. In that manner, the residual toner is no longer held by electrostatic attraction to the photoconductor surface and thus it can be removed more easily at a cleaning station.

In order to avoid overburdening the cleaning station, it is customary to remove all charge present on the photoconductive surface outside of the image area prior to the development step. This is usually done by using an interimage erase lamp to discharge photoconductive material between the trailing edge of one image and the leading edge of the next. Also, edge erase lamps are used to erase charge along the edges of the photoconductor outside of the image area. For example, if the original document is 215.9×279.4-mm (8.5×11-inch) in size, and if a full-sized reproduction is desired, the dimensions of the image on the photoconductor will also be 215.9×279.4-mm (8.5×11-inch).

Many copy machines have the capability of copying various size documents and reproducing them to full size. It is not uncommon for machines to be capable of copying 203.2×254-mm (8×10-inch) originals, 215.9×279.4-mm (8.5×11-inch) originals, 215.9×330.2-mm (8.5×13-inch) originals and 215.9×355.6-mm (8.5×14-inch) originals. Because of the different sized originals the interimage and edge erase mechanisms must be controlled to erase only that part of the photoconductor which is not being used to reproduce an image for a particular size paper.

Conventionally, the interimage erase mechanism has been either an incandescent or fluorescent lamp(s) whose full energization is controlled to erase only the correct area on the photoconductor. Additionally, the lamps are covered by shields which direct the illumination to the photoconductor in order to obtain sharp edge delineation of the erased charge on the photoconductor. For edge erase mechanisms, incandescent lamps have been used where one lamp may erase to the 215.9-mm (8.5-inch) size, for example, and a second lamp to the 203.2-mm (8-inch) size. For both paper sizes, the lamps will be shielded so that sharp cutoff is obtained.

RELATED PATENT

While there has been some experimentation with the use of light-emitting diodes (LEDs), the prior art approach has been too expensive for use in commercial machines since LEDs produce a relatively small quantity of light as compared to incandescent lamps. Consequently, they must be situated in an environment where high efficiency light-transmitting apparatus is used. As a result, LEDs have been used with fiber optics to transmit light to the photoconductor of xerographic machines but because of the cost of fiber optics the system has not been practical. To solve this problem, U.S. Pat. No. 4,255,042 provides an innovative light-transmitting device for channeling light from an LED to a xerographic surface in an economical but efficient manner such that LEDs may be used with photoconductive surfaces in a document copying machine to perform the interimage and edge erase functions. The light channeling device comprises a sheet of transparent plastic material in cubic form, one end of which is juxtaposed to an array of light-emitting diodes (LEDs) for receiving LED emitted light rays and channeling them to a photoconductive surface which is located at the opposite end. In transmission, light rays are reflected from the sides of the channel until they reach the end of the channel near the photoconductor. At that point, the rays spread outwardly in that space between the channel end and the photoconductive surface which causes a loss of sharp edge delineation to the erased area unless the channel end is placed close to the photoconductive surface. Since close relationships to moving surfaces create several undesirable effects, it is an object of this invention to provide a plastic channel for which there is no need to provide such a close relationship in order to obtain sharp edge delineation for the erased area.

Because of the relatively low output level of LEDs, the plastic light channel of U.S. Pat. No. 4,255,042 must be made of highly transmissive material. Even with the best materials, sufficient irradiance of the photoconductor to produce well defined edges in the erase zones is difficult and this difficulty is compounded by factors such as dirt, the change in LED output with age, and change in the sensitivity of the photoconductor with use. Therefore, it is an object of this invention to provide an optical element as a light channel in order to provide a predetermined pattern of light ray distribution from an LED array so that the edges of erase zones receive the more intense LED output, thereby minimizing the effect of those variables which create difficulty.

SUMMARY OF THE INVENTION

This invention provides an improved plastic light channel for transmitting light rays from an array of LEDs to erase charge on a photoconductive surface. The channel is comprised of a plastic optical element with a combination of plano and convex cylindrical surfaces on the end positioned near the LED array and a convex cylindrical surface on the end positioned near the photoconductive surface. In that manner, the more intense rays near the center of each LED are distributed to the edges of the erasure footprint while the less intense rays at the periphery of each LED are distributed toward the center of the footprint. The result is to achieve a sharp edge to the erased area and to keep that edge during machine life.

Since the light channel is an optical element which directs the light rays in a predetermined pattern, there is no need to locate the channel end close to the photoconductive surface.

BRIEF DESCRIPTION OF THE DRAWINGS

The above-mentioned and other features and objects of this invention and the manner of attaining them will become more apparent and the invention itself will best be understood by reference to the following description of embodiments of the invention taken in conjunction with the accompanying drawings, the description of which follows.

DETAILED DESCRIPTION

Figure 1:
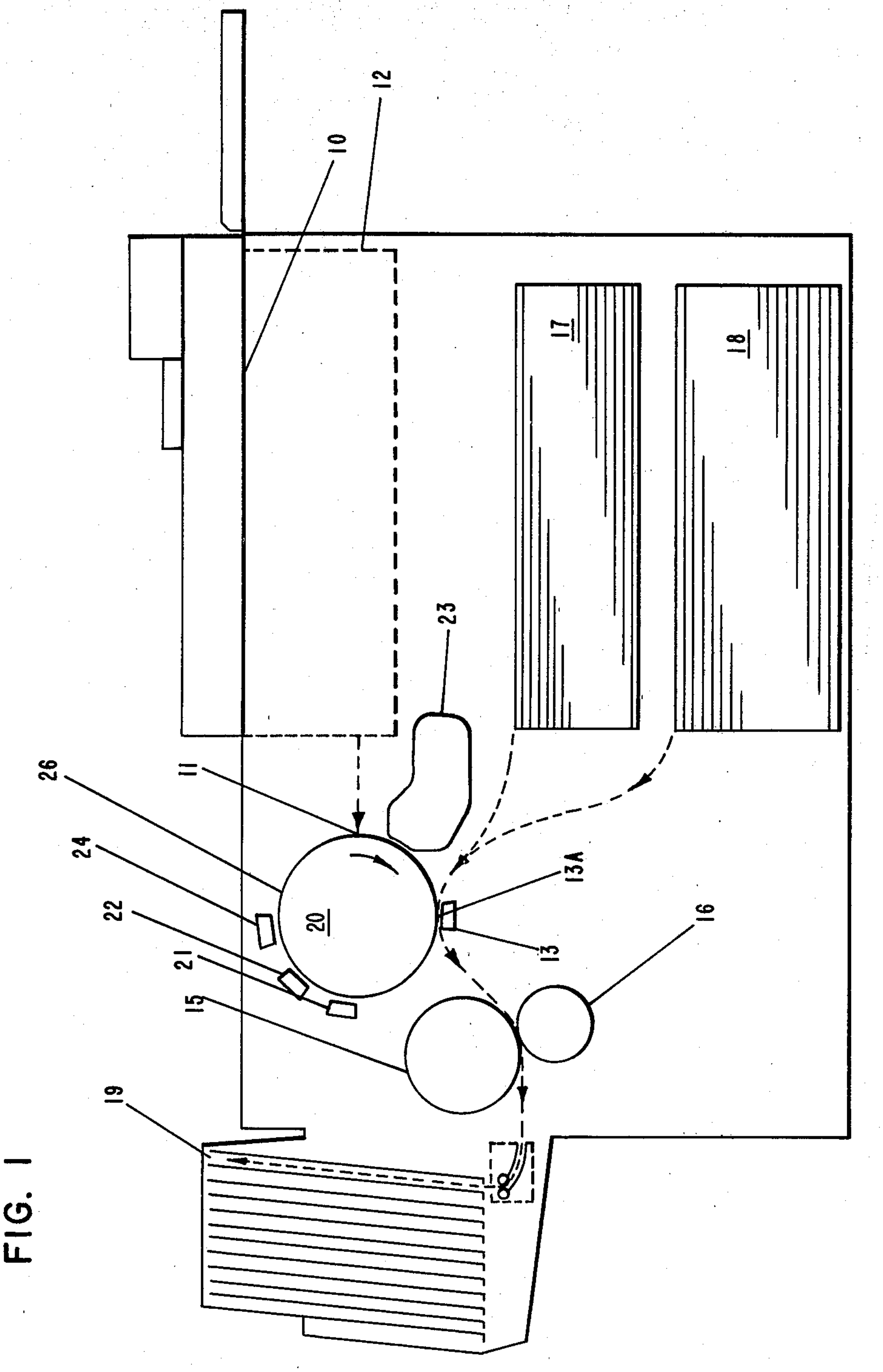
FIGS. 1 and 2 are diagrammatic representations of a typical electrophotographic copier machine which could incorporate the instant invention.

FIG. 1 shows the general configuration of a typical electrophotographic copier machine. A document to be copied is positioned on document glass 10 and imaged upon photoconductive surface 26 at exposure station 11 through optics module 12. Copy paper is sent to transfer station 13A from either one of paper supply bins 17 or 18 where the image, developed by developer 23, is transferred to the copy paper under the influence of transfer corona 13. The copy paper passes through fusing rolls 15 and 16 before entering a selected bin 19 of the collator. A charging corona 21, a preclean corona 22 and an erase lamp 24 are shown located around the periphery of drum 20 which carries photoconductive material 26 in direction A.

Figure 2:
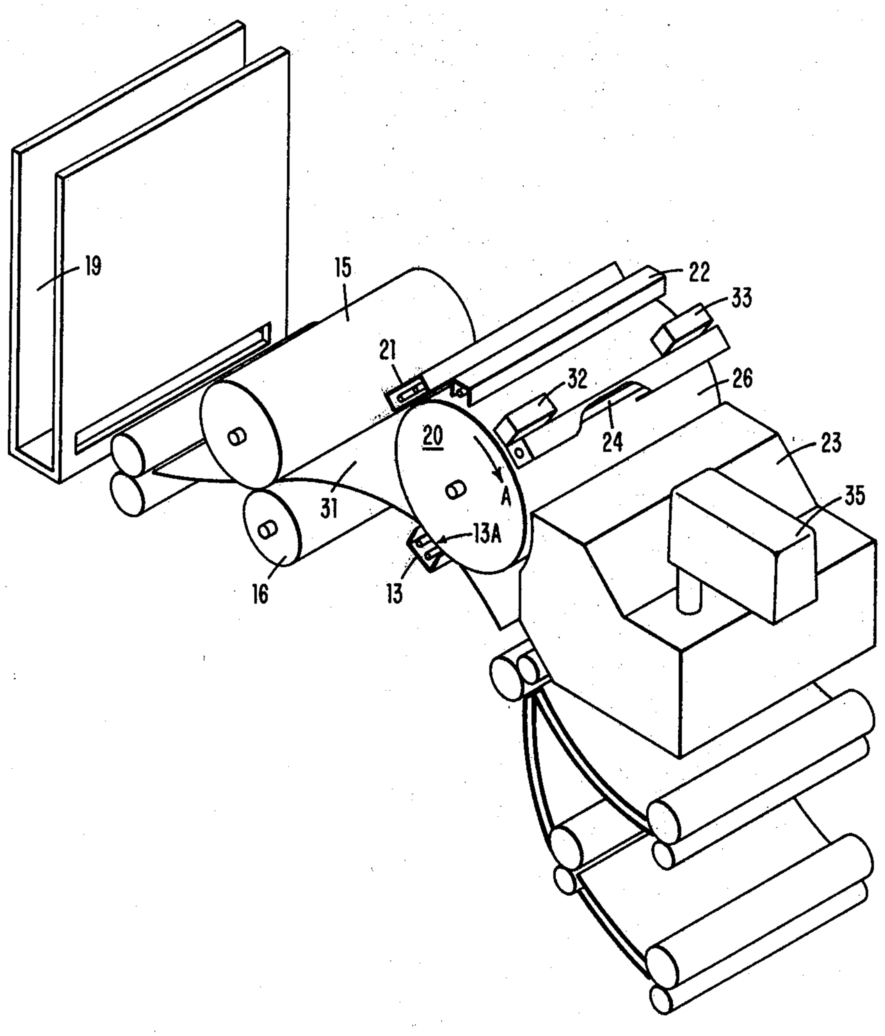

FIG. 2 further illustrates the paper path of the electrophotographic machine of FIG. 1. The particular configuration illustrated is a two-cycle machine in which developing and cleaning is performed at the same station. On the first cycle of operation of such a machine, photoconductor surface 26 located on drum 20 rotates under the charging corona 21 which places a uniform charge over the entire photoconductor. The material then rotates under preclean corona 22 which is deenergized on the first cycle and continues to erase lamps 24, 32 and 33. The function of the erase lamps at this point in the process is to discharge the areas of the photoconductor that will not receive an image of the document to be copied. Consequently, the lamp 24 is energized between image areas and lamps 32 and 33 are energized to erase along the edges of the photoconductive surface so that the charge placed on the photoconductor by the charging station 21 will continue to exist only in, for example, a 215.9×279.4-mm (8.5×11-inch) area of the photoconductor. That charged area then rotates to the exposure station 11, shown in FIG. 1, at which an image of the document to be copied is placed on the charged portion of the photoconductor. Next the photoconductor rotates to the developing mechanism 23 at which toner is placed on the image and then to the transfer station 13A at which the image is transferred to copy paper 31 under the influence of transfer corona 13.

The photoconductor continues to advance from the transfer station to the charging corona 21 which is deenergized for the second cycle and from there to the preclean corona 22 which is now energized in order to neutralize remaining charge on the photoconductor. The photoconductor then rotates to the erase lamp 24 which is energized to completely discharge any charge that may remain. The photoconductor then rotates past the exposure station at which no imaging takes place on this cycle, to the developing mechanism 23 which now acts as a cleaning mechanism to clean away any toner which was not transferred on the first cycle. The photoconductor continues to rotate past a deenergized transfer station 13 to now energized charging corona 21 at which point the second cycle has been completed and the first cycle begins again.

Meanwhile, the copy sheet 31 upon receiving an image of the original, advances from the transfer station to a fusing station illustrated by rolls 15 and 16 and from there into an exit pocket 19 in which the finished copies are retained until removed by the operator. A replenishing mechanism 35 is shown to keep the developer 23 charged to the proper level with toner.

As previously mentioned, in prior art electrophotographic machines, the erase lamp 24 is typically a fluorescent bulb whose light is directed to the photoconductive surface by a shield 24 which contains an aperture so that sharp delineation of the light is obtained. Erase lamps 32 and 33 at either edge of the photoconductor are usually incandescent lamps, which provide light through an aperture to the photoconductive surface in order to define the edges of the charged image area. In the use of the invention described herein, interimage lamp 24 and edge erase lamps 32 and 33 are replaced by a light-emitting diode array with the inventive optical light concentrator now to be described.

Figure 3:
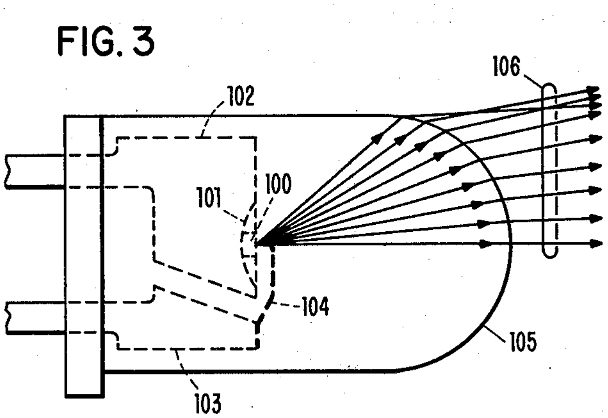
FIGS. 3 and 4 are side and front views of a typical LED such as could be used in the instant invention.
Figure 4:
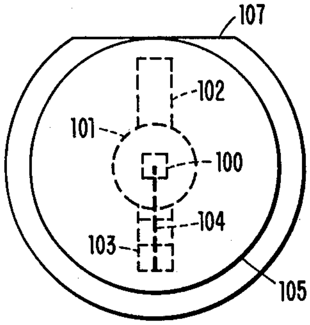

To understand the principles upon which the invention is based, it is well to understand the light distribution which is emitted from a typical light-emitting diode. FIGS. 3 and 4 show side and front views respectively of Hewlett-Packard Part Number QLMP-3322 light-emitting diode which is typical of the light-emitting diodes which can be used in the instant invention. The planar chip 100 which is activated to emit light is located in a molded reflector 101 which is formed into the surface of cathode 102. Energization of planar chip 100 is from anode 103 through connecting wire 104 to chip 100 and on to cathode 102. Light rays emitting from chip 100 pass through an acrylic plastic enclosure 105 which encases the entire structure. Note that as these light rays 106 leave the hemispherical convex end of the enclosure 105, they are refracted as shown in FIG. 3.

Figure 5:
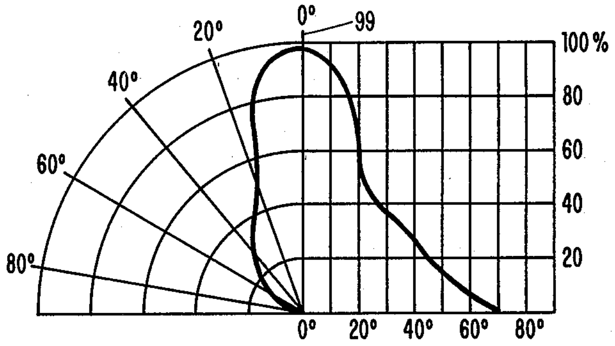
FIG. 5 is a graphical diagram of the light intensity distribution produced by a typical LED.

FIG. 5 illustrates the typical distribution of light intensity produced by the LED. Note that the intensity is greatest from zero degrees out to 20 degrees, that is, the intensity is greatest closest to the central axis 99 of the LED and falls off as the angle increases. Thus, the more intense light pattern produced by the LED is near the centerline, while the less intense radiation is produced near the periphery.

Figure 6:
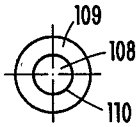
FIG. 6 illustrates the pattern of illumination on a photoconductor surface produced by one LED.

In addition to light distribution, it should also be understood that while the electrophotographic process successfully reproduces photographs and other half-tone or continuous-tone originals, its ability to do so is not as accurate as in ordinary chemical photography for several reasons, one of which is the ability of light rays to erase charge on the photoconductor in gradualized amount. It is known that above a certain critical level of irradiation, charge is erased and a white background is produced while below that level charge is not erased causing toner to deposit during the development process producing a black image. The ability to produce a modified charge content around the critical level resulting in gray tones is present but only to a limited degree. As a consequence, for purposes of simplification in understanding this invention, gray levels are ignored and a certain critical intensity of light irradiation is described as dividing white and black areas. FIG. 6 illustrates the intensity of a light pattern impinging upon a photoconductor produced by the LED of FIG. 3. In this instance, an intensity distribution 108 is shown which is sufficient to erase the charge on the photoconductor while an irradiated area 109 is shown in which the light intensity is too low to erase the charge pattern and thus a black image area results. The critical level 110 separates the two regions.

Figure 7:
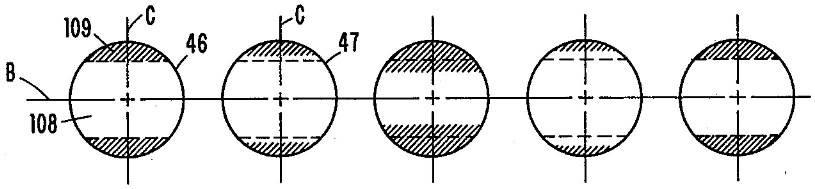
FIG. 7 shows an array of LEDs such as would be used with the instant invention.

As described above, in the electrophotographic process, the photoconductor is charged across its entire surface and then the charge is selectively erased so that the remaining charged area is equal in size to the copy paper. In the practice of this invention, the erase lamps consist of an array of LEDs to irradiate the photoconductor. When the LED of FIG. 3 is placed in an array such as shown in FIG. 7, rays from adjacent LEDs fill in along the B axis from one to another, thus rays from LED 46 and LED 47 irradiate the same area of photoconductor in the area between the two LEDs, raising that area above the critical level. However, in the C axis, the area 109 continues to exist providing an area where the photoconductor is not discharged. Note that area 109 varies from LED to LED due to the variations of light intensity from individual LEDs. The result is that a "scalloped" edge erase line may be produced on the photoconductor rather than the sharp edge erase pattern which is desired. This result is shown in FIG. 8 where the area 108 represents the erased area and the area 109 represents the unerased area with the line 110 illustrating the scalloped effect produced by the array.

Figure 8:
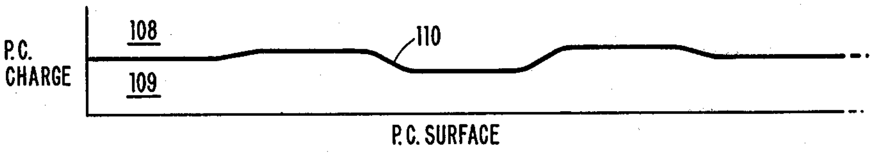
FIG. 8 is similar to FIG. 6 but shows the pattern of illumination on a photoconductive surface produced by an array of LEDs operating according to prior art techniques.
Figure 9:
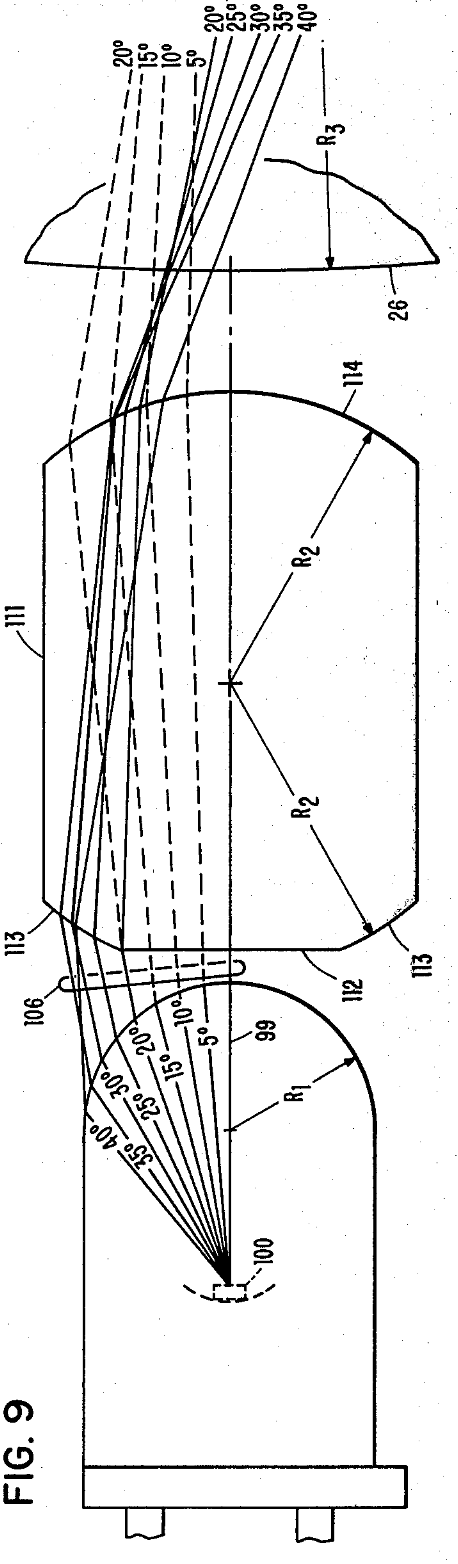
FIG. 9 shows the zonal concentrator optical element of the instant invention.

To remedy the problem illustrated in FIG. 8, the plastic light channel disclosed in the related patent application described above has been replaced by the inventive optical element termed a zonal concentrator 111 shown in FIG. 9. This element is designed to distribute the more intense light rays in the central zone of the light-emitting diode, that is between zero degrees and twenty degrees, toward the periphery or edges of the area to be irradiated (footprint) and distribute the less intense rays, that is from twenty degrees to forty degrees toward the center of the footprint where they add to the strong central axis light. To do that, the entrance end of the zonal concentrator 111 is formed with an entrance end with two focal lengths, that is, one focal length representing a planar surface and another focal length at the periphery of the element representing a convex-cylindrical surface. In FIG. 9, the planar surface is shown at 112 and the convex-cylindrical surfaces at 113. The exit end 114 is formed to one focal length for providing a convex-cylindrical end as shown in FIG. 9.

FIG. 9 also shows an illustration of the redistribution of light produced on the photoconductive drum 20 by the zonal concentrator 111. The light rays 106 emitted by the planar chip 100 from zero to twenty degrees pass through the planar surface 112 of concentrator 111 to be collected at the convex cylindrical exit end 114 and refracted upon the surface 20 of the photoconductor drum near the edges of the footprint. Light rays emitted from twenty to forty degrees at the chip 100 pass through the convex surface 113 at the entrance end and the convex surface 114 at the exit end of the concentrator 111 to be redirected to the photoconductive drum near the center of the footprint. As a result, the high intensity distribution between zero and twenty degrees is directed toward the edges of the footprint while the less intense distribution is directed toward the center, that is, toward the central axis 99.

Figure 11:
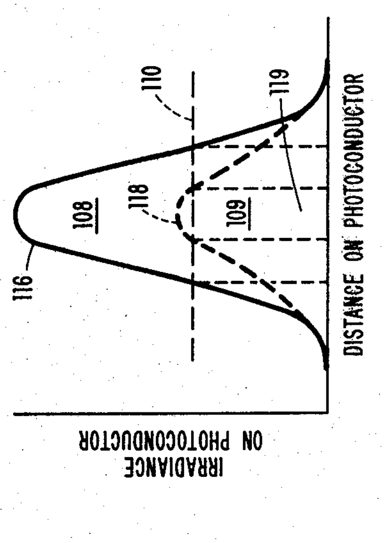
FIG. 11 shows a footprint pattern produced according to prior art techniques.
Figure 10:
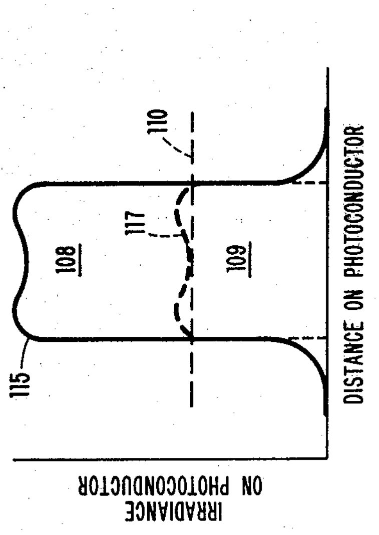
FIG. 10 shows a footprint pattern produced by the instant invention.

FIG. 10 is an idealized graphical representation of the light distribution pattern 115 produced on the photoconductive surface 26 by the concentrator 112. For comparison, FIG. 11 is an idealized graphical representation of the light distribution pattern 116 produced by an LED array where the light rays are not redistributed. The level 110 is that critical level of irradiance above which the photoconductor produces an erased charge area 108 and below which the photoconductor produces an unerased charge level 109. The dashed line irradiance level 117 represents a deteriorated level which is reached because of dirt in the system or because of aging of the LED. The dashed line 118 represents a similar condition for the prior art system. With reference to FIGS. 10 and 11, these factors cause the critical level 110 to reach higher intensity levels thus creating additional difficulty in maintaining the footprint size. Obviously, the redistributed light pattern shown in FIG. 10 is superior in maintaining the expected erasure footprint size to that of FIG. 11. As shown by the comparison of FIGS. 10 and 11, the irradiance pattern of FIG. 11 shows a difference in the amount of photoconductor being irradiated above level 110 when LED intensity falloff occurs, while a change in the irradiance level of FIG. 9 does not change the dimensions of the footprint significantly. Thus, the scalloped effect illustrated in FIG. 8 can be eliminated or controlled by use of the zonal concentrator 111.

It should also be noted that critical level 110 is not a stationary level throughout the life of a machine since this level of irradiance is also effected by the use and age of the photoconductor. For example, photoconductor receptivity changes due to electrostatic degradation of the material itself, due to changes in the surface characteristics caused by repeated juxtaposition of the photoconductive surface with copy receiving mediums such as paper, and due to repeated development of the material resulting in some amount of toner deposition on the surface of the photoconductor.

Additionally, use of this invention provides a sharp edge to the light footprint without having the zonal concentrator close to the surface of the photoconductive drum since the light rays are refracted in a predetermined manner to pass from the exit end of the concentrator to the photoconductive surface. Spreading of light rays between the exit end and the surface is eliminated.

It should be noted that the plano-convex surfaces of the entrance end and the convex surface of the exit end are the only surfaces of optic element 111 requiring condensor lens, optical quality in the extruded plastic. Light rays do not reflect from the edge walls of the concentrator 111 and therefore the edge walls do not need to meet optical quality.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. An electrophotographic copier machine wherein a photoreceptive surface is charged to receive an image within an image area of specified size, comprising:
- means upon which said photoreceptive surface is mounted for moving said surface in a continuous path;
- charge-generating means located along said path for producing a relatively uniform electrostatic charge on said surface;
- exposing means for directing light rays from an object to said surface to produce a variable discharge of said image area such that said image area is caused to bear an electrostatic image of said object;
- developing means to develop said electrostatic image by depositing developing material on said surface;
- transfer means to transfer the developed image to a copy-receiving medium;
- cleaning means to clean said surface of excess developing material to prepare said surface for producing a subsequent copy;
- charge erase means located along said path between said charge generating means and said developing means for removing charge on said photoreceptive surface, said erase means comprising an array of light-emnitting diodes (LED) for producing radiation which strikes said photoreceptive surface in a definite area to create an erasure footprint; and
- optical element means located between said LEDs and said photoreceptive surface having an end with a first surface formed to a first focal length and a second surface formed to a second focal length.

2. The machine of claim 1 wherein said end of said optical element is positioned as an entrance end near said LEDs to receive radiation therefrom.

3. The machine of claim 2 further including an exit end for said optical element having a surface formed to a third focal length.

4. The machine of claim 3 wherein said first surface is planar and said second surface is convex and wherein the exit surface is convex.

5. The machine of claim 4 wherein said planar surface is located to receive radiation emitted near a central axis of said LED while said convex surface is located to receive radiation emitted at larger angles from said central axis.

6. The machine of claim 5 wherein said optical element is positioned relative to said LEDs such that said planar surface receives radiation along said central axis to an angle of approximately 20 degrees therefrom while said convex surface receives radiation from approximately 20 degrees to approximately 40 degrees.

7. The machine of claim 1 wherein said optical element means is positioned relative to said LEDs and said surface to distribute the more intense radiation emitted near the central axis of each LED to the edges of said erasure footprint and to distribute the less intense radiation emitted at larger angles from said central axis to the central portion of said erasure footprint.

8. In an electrophotographic machine of the transfer type wherein erase mechanisms are included for shaping the charged image area of a moving photoreceptive surface to the dimensions of the image, the improvements comprising:
- an array of LEDs for producing light rays to erase charge outside of said image area, said array located adjacent to said surface across the width thereof; and
- optical element means located between said photoreceptive surface and said array of LEDs having an end with a first surface formed to a first focal length and a second surface formed to a second focal length.

9. The machine of claim 8 wherein said end of said optical element is positioned as an entrance end near said LEDs to receive radiation therefrom.

10. The machine of claim 9 further including an exit end for said optical element having a surface formed to a third focal length.

11. The machine of claim 10 wherein said first surface is planar and said second surface is convex and wherein the exit surface is convex.

12. The machine of claim 11 wherein said planar surface is located to receive radiation emitted near a central axis of said LED while said convex surface is located to receive radiation emitted at larger angles from said central axis.

13. The machine of claim 12 wherein said optical element is positioned relative to said LEDs such that said planar surface receives radiation along said central axis to an angle of approximately 20 degrees therefrom while said convex surface receives radiation from approximately 20 degrees to approximately 40 degrees.

14. The machine of claim 8 wherein said optical element means is positioned relative to said LEDs and said surface to distribute the more intense radiation emitted near the central axis of each LED to the edges of an erasure footprint and to distribute the less intense radiation emitted at larger angles from said central axis to the central portion of said erasure footprint.

* * * * *